(12) United States Patent
Clausner et al.

(10) Patent No.: US 7,275,049 B2
(45) Date of Patent: Sep. 25, 2007

(54) METHOD FOR SPEECH-BASED DATA RETRIEVAL ON PORTABLE DEVICES

(75) Inventors: Timothy C. Clausner, Los Angeles, CA (US); Brent L. Hadley, Kent, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 10/870,880

(22) Filed: Jun. 16, 2004

(65) Prior Publication Data
US 2005/0283369 A1    Dec. 22, 2005

(51) Int. Cl.
G06F 17/00 (2006.01)
G06N 7/00 (2006.01)
G06N 7/08 (2006.01)
(52) U.S. Cl. ...................................................... 706/55
(58) Field of Classification Search .................. 706/55
See application file for complete search history.

(56) References Cited

U.S. PATENT DOCUMENTS

| | | | | |
|---|---|---|---|---|
| 5,003,506 A | * | 3/1991 | Itaya | 711/172 |
| 5,799,276 A | * | 8/1998 | Komissarchik et al. | 704/251 |
| 6,173,251 B1 | | 1/2001 | Ito et al. | |
| 6,327,343 B1 | * | 12/2001 | Epstein et al. | 379/88.01 |
| 6,510,417 B1 | * | 1/2003 | Woods et al. | 704/275 |
| 6,901,364 B2 | * | 5/2005 | Nguyen et al. | 704/235 |
| 7,103,563 B1 | * | 9/2006 | Voisin et al. | 705/14 |
| 2003/0204492 A1 | | 10/2003 | Wolf et al. | |
| 2004/0162724 A1 | * | 8/2004 | Hill et al. | 704/231 |
| 2004/0193420 A1 | * | 9/2004 | Kennewick et al. | 704/257 |

FOREIGN PATENT DOCUMENTS

EP    0287310 A2    4/1988

OTHER PUBLICATIONS

Paul S. Jacobs et al., Natural Lanuage Techniques for Intelligent Information Retrieval, Association for Computing Machinery, Jun. 1988, pp. 85-99.

* cited by examiner

*Primary Examiner*—Joseph P Hirl
*Assistant Examiner*—Michael B. Holmes
(74) *Attorney, Agent, or Firm*—Ingrassia Fisher & Lorenz, P.C.

(57) ABSTRACT

Methods and apparatus are provided for speech-based data retrieval from a portable communication device, such as a cell phone with an onboard dataset. The method comprises semantically indexing the dataset with domain related keywords that are intuitive to a user familiar with the dataset domain. When the user speaks a keyword, a speech recognition system within the portable device links the keyword to a semantically related data file in the dataset. A processor in the portable communication device retrieves the selected data and converts it for presentation on a visual display and/or an audio output.

15 Claims, 6 Drawing Sheets

US 7,275,049 B2

METHOD FOR SPEECH-BASED DATA RETRIEVAL ON PORTABLE DEVICES

TECHNICAL FIELD

The present invention generally relates to speech recognition devices, and more particularly relates to speech-based data retrieval on portable devices.

BACKGROUND

Many current applications of speech recognition technology are designed to process a limited universe of words, rather than an unconstrained general lexical query of unrestricted domains, such as a Google type of search engine. That is, a speech recognition application can usually function with limited resources if the application is constrained within a topical domain, such as weather, medical, finance, etc. The application can also be constrained by the limitation of allowable expressions, through the use of directed dialog, scripted expressions, fixed menu selections, and the like. However, topical domain constraints do not usually have well defined limits, and may lead to ongoing fine-tuning of the speech recognition system in order to provide the user with an expected range of allowable speech.

For portable and ultra-portable communication devices, such as cell phones, personal digital assistants (PDA's), pocket PC's, and the like, speech recognition capabilities are typically constrained by the inherent processing and memory limitations of such a device. While plug-in memory cards can be used to enhance the functionality of a portable communication device, the memory cards are often limited to single-purpose operating system applications, and generally do not have the capacity to accommodate unconstrained speech recognition systems utilizing large lexicons and grammar tools.

Accordingly, it is desirable to provide a portable/ultra-portable communication device having speech recognition capabilities that can be used to access and navigate relatively large datasets stored in an onboard memory card or other type of data source. In addition, it is desirable to provide a lexical query process that is intuitive and convenient for searching a domain-related data source. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for accessing information stored in a computer memory, referred to herein as a dataset, via a speech-recognizing portable communication device. The datasets typically include data files that are indexed according to semantic relations between the data and a lexicon of keywords within a topical domain. One exemplary method includes the broad steps of recognizing a keyword that is spoken into the portable communication device, linking the recognized keyword to a related file in the semantically indexed dataset, retrieving the related file from the semantically indexed dataset, and processing the retrieved file for presentation. Typically, the retrieved file can be displayed on a screen within the portable communication device, or it can be presented audibly, or in some other form.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of speech-based data retrieval from a portable communication device, such as a cell phone. In order to access relatively large datasets from a portable communication device, a speech-recognition system can be configured within the communication device to use a domain-related semantic indexing scheme that optimizes the search process of a data source by providing the key terms and concepts for searching correspondingly organized data. In various embodiments, a semantic index and corresponding data source are stored within the memory of a memory card that plugs into the portable communication device. Alternately, the data source can be configured as built-in memory or as a remote source that can communicate, e.g. via a wireless network, with an exemplary portable communication device.

Figure 1:
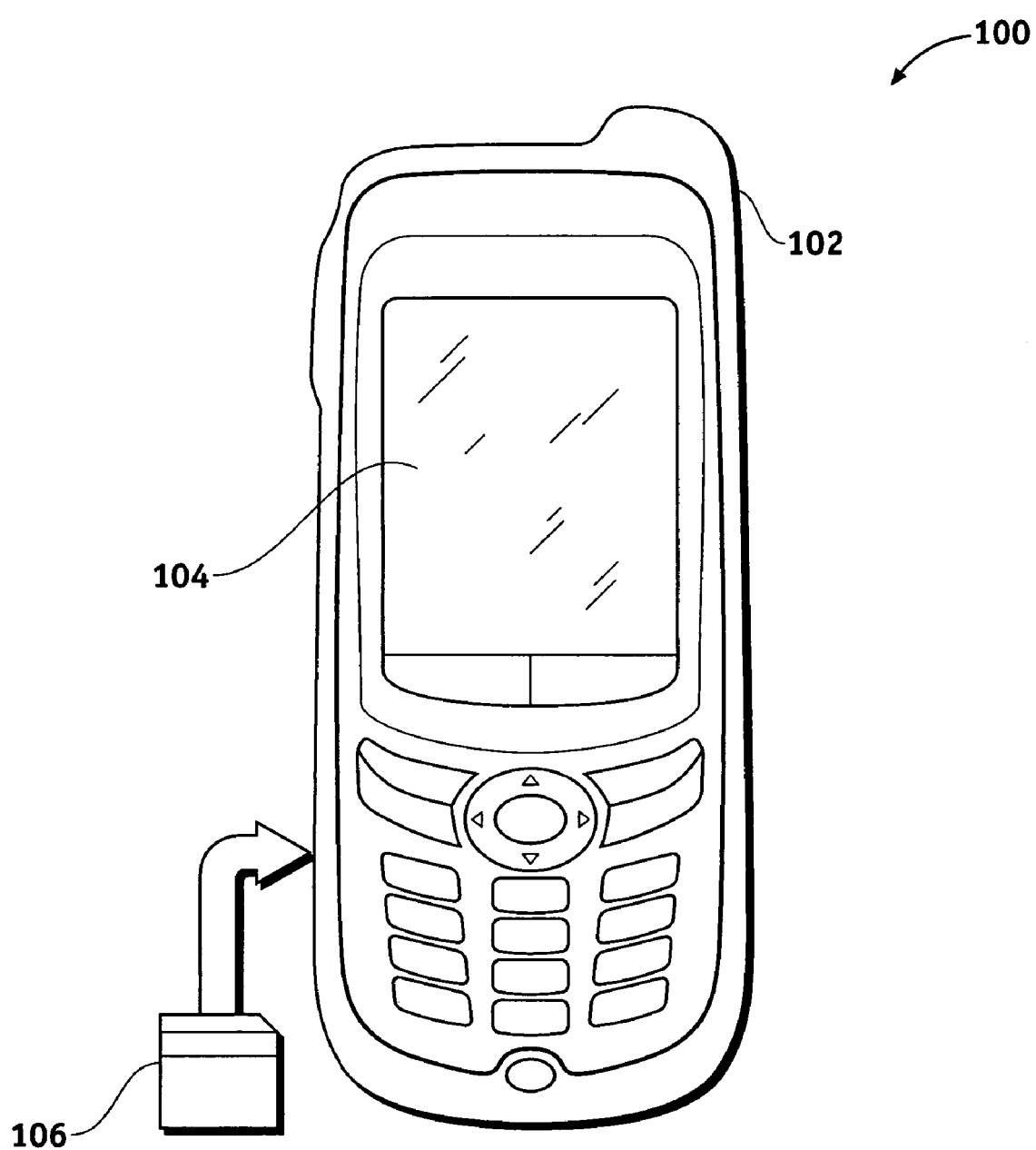
FIG. 1 is an illustration of an exemplary portable communication device.

According to an exemplary embodiment of a portable/ultra-portable communication system 100, as shown in FIG. 1, a speech-related portable communication device 102 may be any type of cell phone, PDA, Pocket PC or other portable device capable of responding to the spoken word. Portable communication device 102 is typically configured with a display 104, and a port for a plug-in memory card 106. Memory card 106 can be pre-programmed to store a relatively large dataset (e.g., a dataset on the order of about 1 to 10 gigabytes) or other type of user-accessible data resource. The particular communication system 100 shown in FIG. 1 may be referred to as a "smart phone", denoting a speech-related portable communication device 102 in combination with a plug-in memory card 106.

Figure 2:
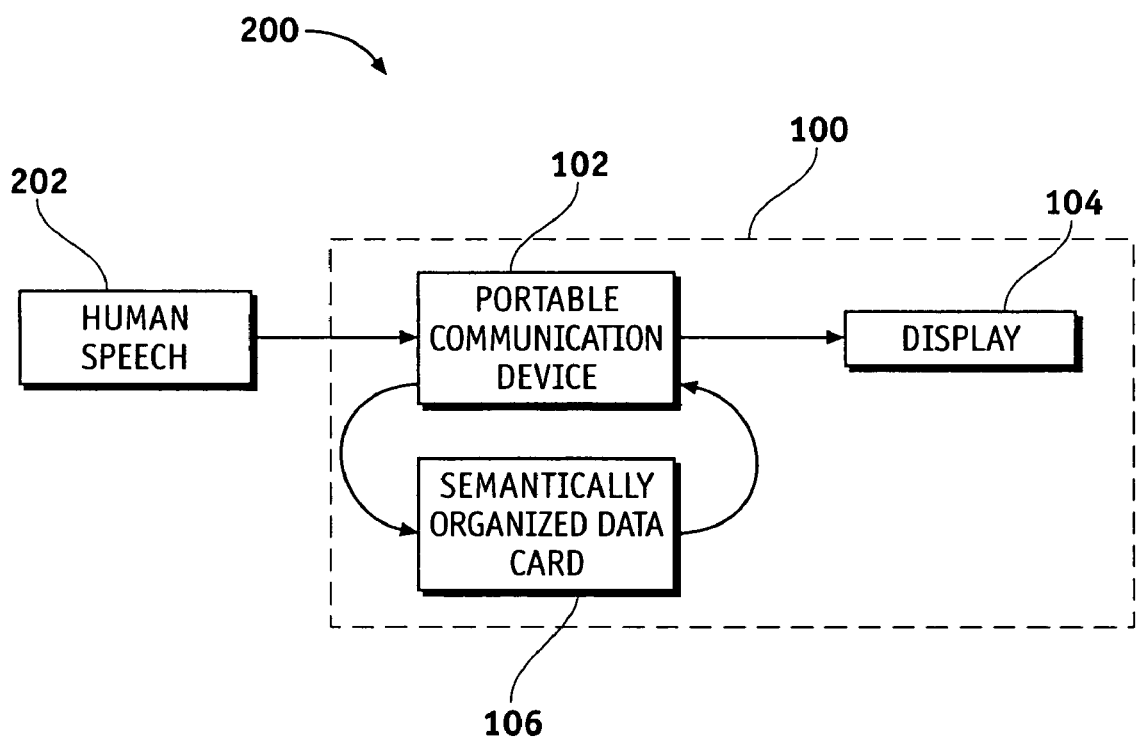
FIG. 2 is an exemplary flow diagram of a method for speech-based retrieval of data from a portable communication device.

As previously noted, the use of unconstrained speech recognition is generally not feasible with a portable communication device due to processing and memory limitations of the device. Plug-in memory cards, however, do have the capability of storing relatively large amounts of data that can be a valuable resource to a user. To enable a user to access this type of data resource with the spoken word, an exemplary method 200 for communicating between a user 202 and a communication system 100 is illustrated in the simplified flow diagram of FIG. 2.

In this exemplary embodiment, a typical user 202 is assumed to be generally knowledgeable about the particular domain of the data stored on plug-in memory card 106. That is, while the form of the stored data may be in text, graphic, audio, video or other data form, a data domain, for example, can relate to a topical category such as e-mail, maps, building models, lists of places, language resources, cultural and religious references, instruction manuals, and the like. The typical user may also be assumed to have prior knowledge (or ready access to) a set of keywords related to the particular data domain. As will be described below, the domain-related data files stored within memory card 106 are typically organized and indexed to correspond semantically with the set of keywords.

When user 202 speaks one or more keywords into portable communication device 102, either one at a time or continuously, the keyword (s) are typically speech-recognized by portable communication device 102 and processed into an appropriate text format for searching a semantically indexed dataset (not shown) stored on memory card 106. That is, a semantically indexed dataset in the exemplary embodiment would typically include an index of text words and a grouping of data files where the text words are associated with the data files in accordance with the meaning of the text words. This type of dataset configuration will be described in more detail in conjunction with FIG. 4, below.

The semantic indexing of the data on memory card 106 enables the search and retrieval of a data file that is semantically linked to the spoken keyword(s). The retrieved data file can then be processed by portable communication device 102 for presentation on a display 104 that is typically integrated within portable communication device 102. The display presentation can be in text and/or graphic form, or may be in some other suitable format. Alternately, the retrieved data can be processed into audible form, either in place of the displayed data, or as a supplement.

Figure 3:
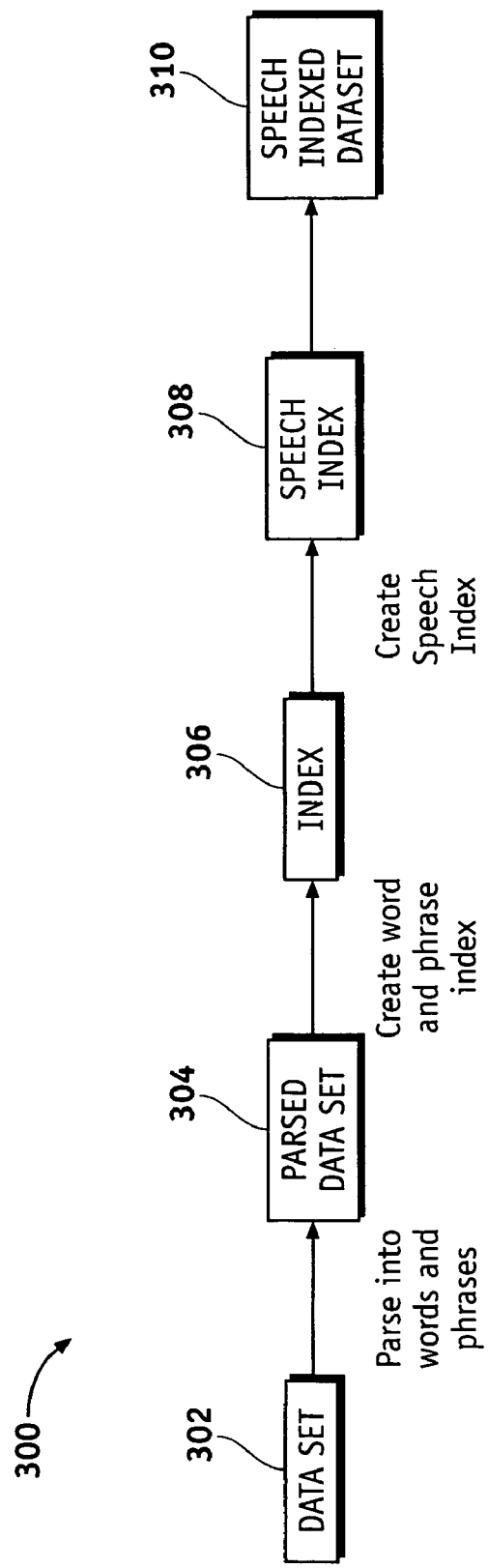
FIG. 3 is an exemplary flow diagram of a method for constructing a speech indexed dataset.

An exemplary method 300 for semantically indexing a dataset 302 is illustrated in the flow diagram of FIG. 3. Dataset 302 may consist of text, diagrams, images, voice, video, or other types of modal data, as well as raw numerical data or the like. In an exemplary embodiment, dataset 302 can be parsed with respect to the type of data involved. For example, morphosyntactic parsing can decompose text data into word parts, words, multi-word phrases, or any other linguistic constituents, thereby generating a parsed dataset 304. The exemplary parsed dataset 304 can then be analyzed to create a word and phrase index 306. In one exemplary embodiment, word and phrase index 306 can be organized in accordance with a statistical analysis to ascertain the relative importance of the words and phrases in parsed dataset 304. In this exemplary embodiment, the words and phrases in index 306 are further analyzed to determine their relative statistical significance. The words and phrases deemed to be statistically significant are typically arranged in a speech index 308 by associating information usable by a speech recognizer with each index item. Moreover, the word associations are typically selected to reflect the types of queries or commands (i.e., keywords) that are anticipated from a user. Linking speech index 308 to dataset 302 can provide a speech-indexed dataset 310. That is, speech-indexed dataset 310 typically functions as a semantically indexed dictionary for domain-related keywords.

Figure 4:
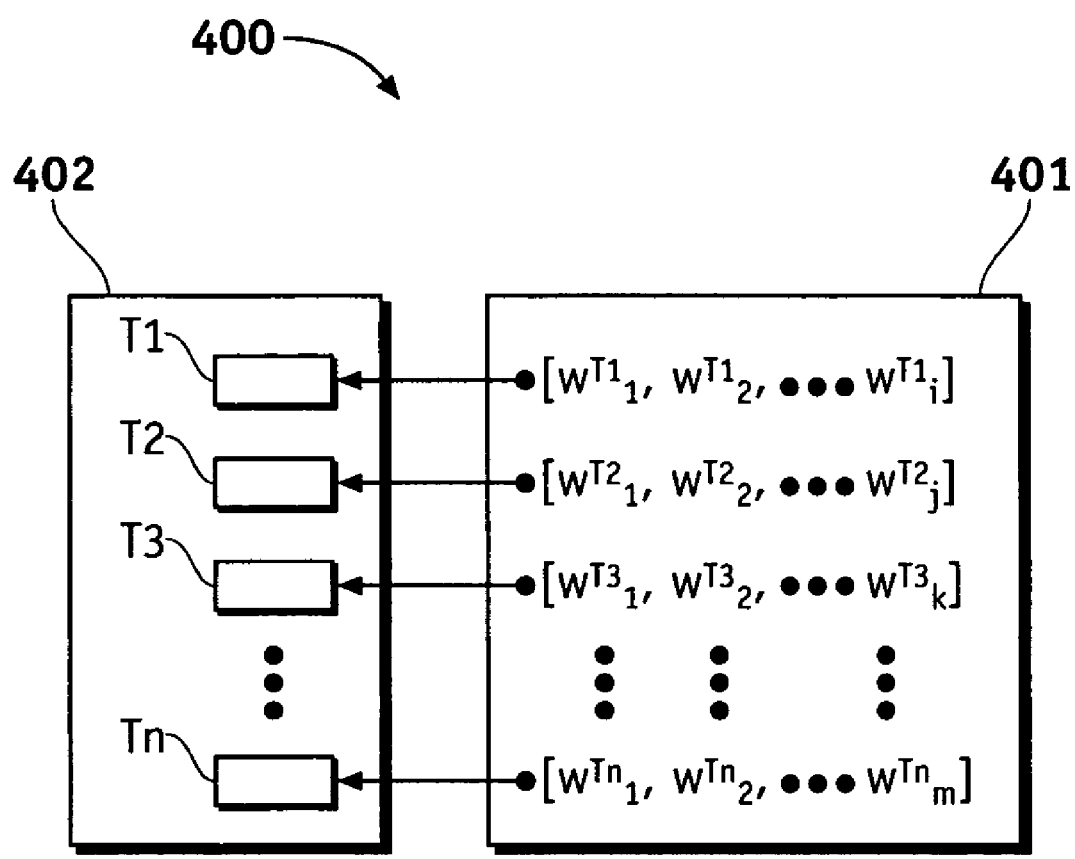
FIG. 4 is an exemplary block diagram of a semantic index configuration.

An exemplary method for creating a semantically indexed dataset 400 is illustrated in FIG. 4. In this embodiment, a set of indexed words 401 is associated with a group of stored text files 402. For example, an index item for some portion of the text file $T_n$ consists of a list of m words ($w^{Tn}_1, w^{Tn}_2, \ldots w^{Tn}_m$). That is, for a text file $T_1$, the corresponding list of i words are typically designated as $w^{T1}_1, w^{T1}_2, \ldots w^{T1}_i$. For a text file $T_2$, the corresponding list of j words are designated as $w^{T2}_1, w^{T2}_2, \ldots w^{T2}_j$, and so on. Each word is typically a lexical item, phrase of a natural language or other discrete datum from the respective text file. The lists of indexed words 401 typically behave as a list of keywords that can be used to query semantically indexed dataset 400. It should be noted that the spoken keywords do not have to exactly match the index words, but can be translated semantically by the exemplary process.

In the case of a semantically indexed dataset containing non-textual data, the unit of data denoted $T_n$ would typically be whatever subset of data is relevant to the type and structure of the dataset. A semantically indexed dataset 400 is typically stored on a plug-in memory card (106 in FIG. 1) for a device such as portable communication device 102. In alternate embodiments, data files 402 can be stored in other types of accessible memory configurations.

Figure 5:
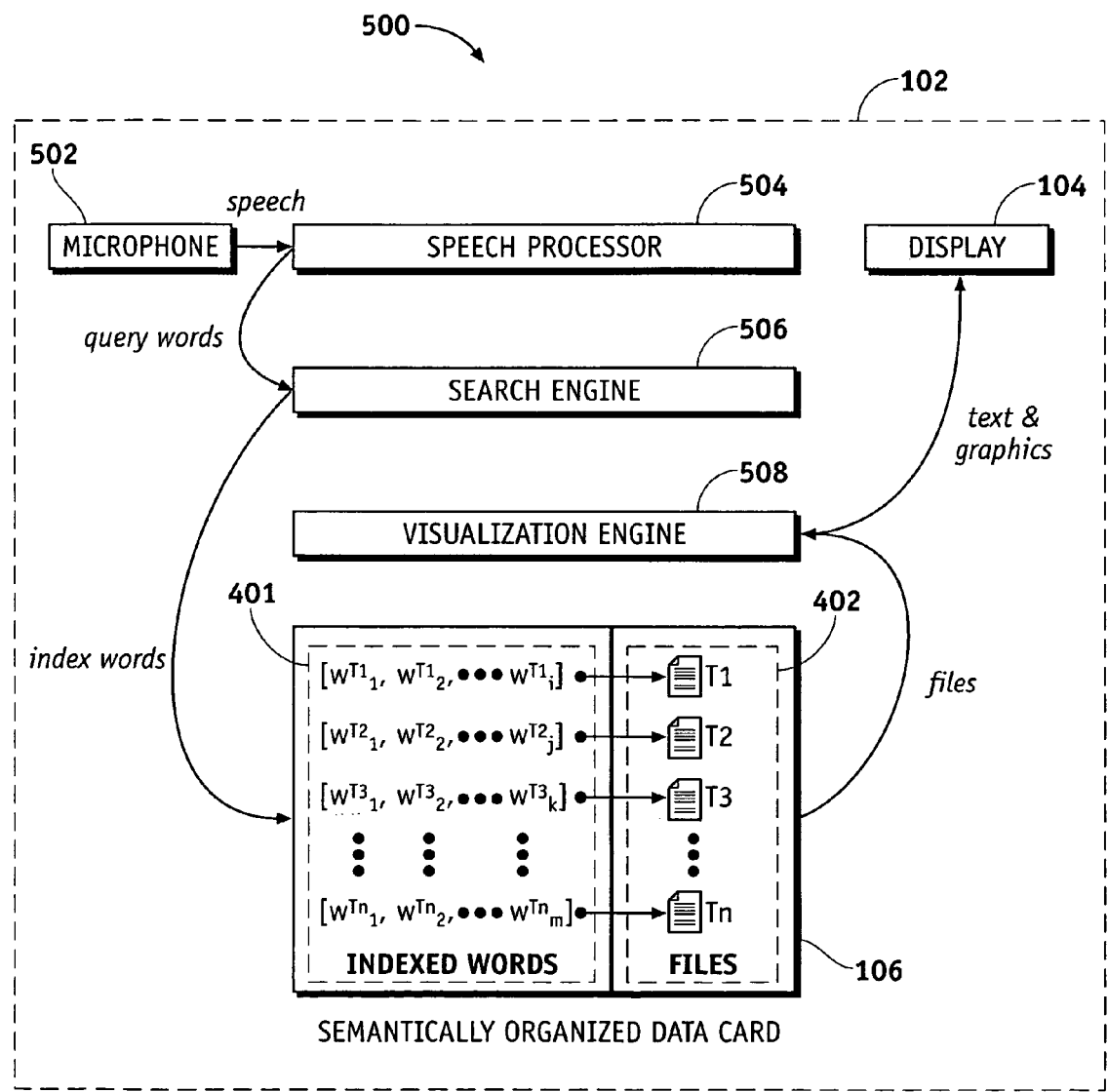
FIG. 5 is an exemplary block diagram of a speech-based data retrieval system for a portable communication device.

An overview of an exemplary speech-based data retrieval communication system 500, as heretofore described, is illustrated in FIG. 5. A user (not shown) typically begins the data retrieval process by speaking one or more keywords as a query or command into a microphone 502 within a portable communication device 102. The user generally knows that the spoken keyword(s) are relevant to the domain of the data stored on memory card 106. The keyword signal out of microphone 502 is typically entered into a speech processor 504 within portable communication device 102, where it can be processed into text query words. The text query words are then typically transferred to a search engine 506 (in portable communication device 102) that generally runs concurrently with speech processor 504. Search engine 506 is typically configured to search indexed words 401 on memory card 106 for a match between the text query words and semantically associated index words. The semantic matching process may incorporate a range of cognitive science techniques, including simple lexical matching as well as more complex semantic search, such as accommodating input synonyms (e.g., "get"="show"="display").

The semantically matched index words are typically associated with a data file in the group of text files 402 on memory card 106. For example, text file $T_1$ is shown in FIG. 5 to be associated with the corresponding list of indexed words $w^{T1}_1, w^{T1}_2, \ldots w^{T1}_i$. As such, a text query matched to text file $T_1$ index words would typically enable text file $T_1$ to be retrieved from memory card 106 and transferred to a visualization engine 508 within portable communication device 102. Visualization engine 508 is typically configured to process the retrieved data file $T_1$ for presentation to the user. In the exemplary embodiment illustrated in FIG. 5, the output signal from visualization engine 508 is presented visually in text and/or graphic form on a display 104. An exemplary visual display of the retrieved data may be in the form of a list of file names or icons for selection or refinement. Alternately, the data file output signal can be presented in other forms, such as audio, or can be visually displayed on an external device.

Simulation tests of the exemplary embodiments described herein have been performed to demonstrate the feasibility of the exemplary semantic matching technique. For example, test data indicate that approximately 50,000 documents indexed on a data card with about 1 gigabyte (GB) storage capacity can be searched by speaking approximately 3 to 5 words, resulting in about 3 to 8 matches.

One exemplary application area for mobile speech-related data retrieval is field maintenance. For example, a maintenance technician working in a confined space can access a relatively large dataset of service manuals by speaking keywords into an appropriately organized smart phone, without the need for hands-on interfacing (e.g., using a keyboard or pointing device). Another exemplary application area is reconnaissance, where a person in a remote location can access geographical data from a smart phone dataset. It can be appreciated that many other types of applications can also benefit from the convenience of accessing relatively large datasets by speaking into a portable communication device.

Figure 6:
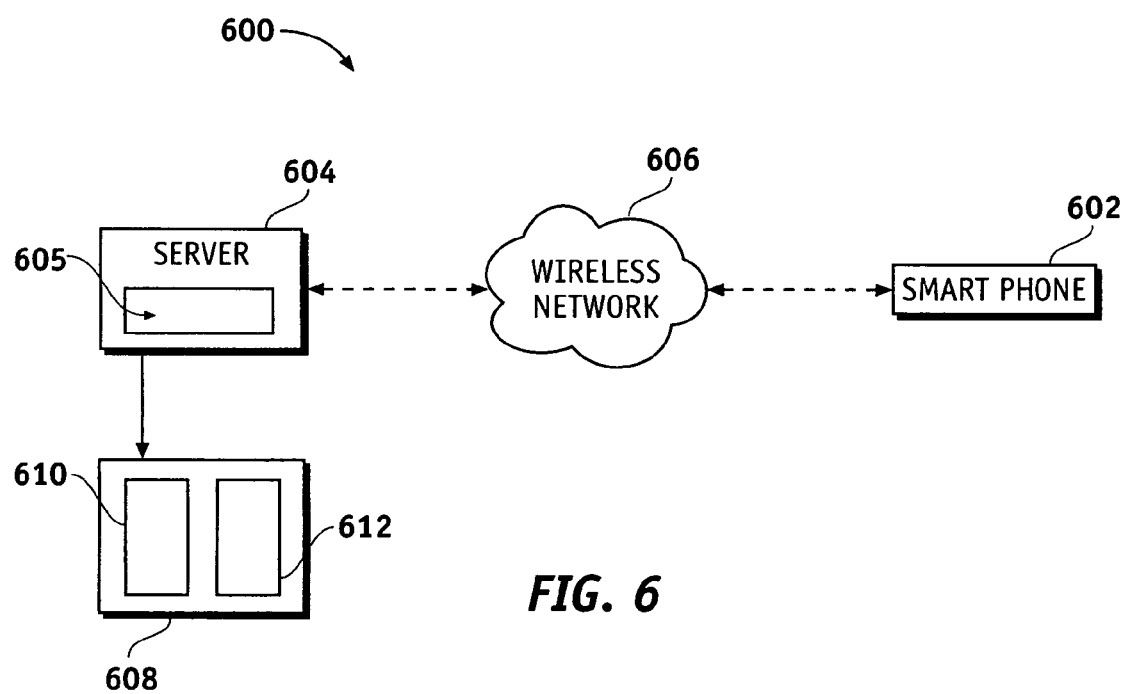
FIG. 6 is an illustration of an exemplary wireless network application of a speech-based data retrieval system for a portable communication device.

Another type of exemplary embodiment 600 is illustrated in FIG. 6. In this exemplary embodiment, a portable communication device 602 with speech recognition capabilities can access a server 604 via a wireless communication network 606, such as the Internet. Server 604 can include a search engine 605 to receive a text query word from communication device 602 in order to activate a search of a semantically indexed dataset 608. Dataset 608 would typically be configured with a word index 610 and an associated group of data files 612. In this type of embodiment, a text query word from search engine 605 is matched semantically to a word in word index 610, thereby enabling server 604 to retrieve the associated file from the data file group 612. Server 604 can then transmit the retrieved data file electronically to communication device 602 via network 606. Various alternative embodiments of this type of application can include speech processing at the server rather than at the communication device, or some other hybrid processing combination of the server and communication device.

Accordingly, the shortcomings of the prior art have been overcome by providing an improved method and apparatus for accessing relatively large datasets by speech communication with a portable device, such as a smart phone, PDA, Pocket PC, etc. The exemplary method combines speech recognition and lexical query with semantic indexing of words and terms related to a particular data domain. A typical apparatus configuration includes a cell phone equipped with a plug-in memory card containing a semantically indexed domain-related dataset (i.e., a smart phone). A user can speak one or more domain-related keywords into the smart phone to activate a data retrieval process. A speech recognizer in the smart phone typically processes the spoken keywords into query words to enable an onboard search engine to find a match between the query words and semantically related index words in the semantically indexed database. A processor within the smart phone can then retrieve selected files associated with the matched index words and can present the retrieved data in a visual format on the smart phone display. Alternately, or in combination with the visual data, the retrieved data can also be presented in audible form.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of speech-based data retrieval from a portable communication device having access to a plug-in memory card dataset that has been semantically indexed for a non-natural language topical domain, comprising the steps of:
    a) converting one or more spoken keywords related to the non-natural language topical domain into a query word signal;
    b) linking the query word signal to one or more related index words stored in the semantically indexed plug-in memory card dataset;
    c) retrieving a data file stored in the semantically indexed plug-in memory card dataset that is associated with the one or more linked index words; and
    d) processing the retrieved data file for presentation.

2. The method of claim 1 wherein semantic indexing of a non-natural language subset of the dataset comprises associating a list of m index words $(w^{Tn}_1, w^{Tn}_2, \ldots w^{Tn}_m)$ with a corresponding data file $T_n$.

3. The method of claim 2 wherein each of the m index words has an association with the non-natural language data in file $T_n$.

4. The method of claim 1 wherein the linking step comprises associating the query word signal with index words that are related in meaning to the query word signal.

5. The method of claim 1 wherein the processing step comprises generating a visual display of the retrieved data file.

6. The method of claim 1 wherein the processing step comprises generating an audible output of the retrieved data file.

7. A speech-based portable communication device, comprising:
    an accessible dataset having semantically indexed data files related to a lexicon of keywords, wherein the dataset is implemented on a plug-in memory card;
    a speech recognition and search system configured to link one or more of the lexicon of keywords to semantically related non-natural language data in the accessible dataset;
    a processor configured to retrieve the keyword-linked data from the accessible dataset and to process the retrieved data for presentation; and
    an output device configured to receive the processed data from the processor and to present the processed data.

8. The portable communication device of claim 7 wherein the speech recognition and search system is activated by human speech.

9. The portable communication device of claim 7 wherein the output device is configured to present the processed data as a visual display.

10. The portable communication device of claim 7 wherein the output device is configured to present the processed data in audible form.

11. The portable communication device of claim 7 wherein the lexicon of keywords is intuitively related to the semantic index of data files in the accessible dataset.

12. The portable communication device of claim 7 wherein the accessible dataset comprises a non-natural language topical domain.

13. The portable communication device of claim 7 wherein the accessible dataset is configured to communicate with the portable communication device via a remote network.

14. The portable communication device of claim 13 wherein the remote network is a wireless network.

15. A method of speech-based data retrieval from a portable communication device having access to a plug-in memory card dataset that has been semantically indexed for a non-natural language topical domain, comprising the steps of:

a) converting one or more spoken keywords related to the non-natural language topical domain into a query word signal;

b) linking the query word signal to synonyms of one or more related index words stored in the semantically indexed plug-in memory card dataset;

c) linking the synonyms of the one or more related index words to their respective one or more related index words;

d) retrieving a data file stored in the semantically indexed plug-in memory card dataset that is associated with the one or more related index words; and e) processing the retrieved data file for presentation.

* * * * *